US010525788B2

United States Patent
Lee et al.

(10) Patent No.: US 10,525,788 B2
(45) Date of Patent: Jan. 7, 2020

(54) VEHICLE AIR CONDITIONING SYSTEM FOR SEPARATELY CONTROLLING FLOW OF INSIDE/OUTSIDE AIR

(71) Applicants: Hyundai Motor Company, Seoul (KR); Kia Motors Corporation, Seoul (KR); DOOWON CLIMATE CONTROL CO., LTD., Asan-si (KR)

(72) Inventors: Yoon Hyung Lee, Seoul (KR); Byeong Moo Jang, Suwon-si (KR); Myung Hun Kang, Jeonju-si (KR); Jong Sik Bae, Suwon-si (KR); Chul Min Jang, Asan-si (KR)

(73) Assignees: Hyundai Motor Company, Seoul (KR); Kia Motors Corporation, Seoul (KR); DOOWON CLIMATE CONTROL CO., LTD., Asan-si (KR)

( * ) Notice: Subject to any disclaimer, the term of this patent is extended or adjusted under 35 U.S.C. 154(b) by 241 days.

(21) Appl. No.: 15/376,236

(22) Filed: Dec. 12, 2016

(65) Prior Publication Data
US 2018/0072131 A1  Mar. 15, 2018

(30) Foreign Application Priority Data
Sep. 12, 2016  (KR) .......................... 10-2016-0117017

(51) Int. Cl.
*B60H 1/00* (2006.01)
*B60H 1/02* (2006.01)
(Continued)

(52) U.S. Cl.
CPC ..... *B60H 1/00471* (2013.01); *B60H 1/00028* (2013.01); *B60H 1/00064* (2013.01);
(Continued)

(58) Field of Classification Search
CPC ...... B60H 1/00471; B60H 2001/00135; B60H 1/00028
(Continued)

(56) References Cited

U.S. PATENT DOCUMENTS 5,699,960 A * 12/1997 Kato .................... B60H 1/0065
237/12.3 A
5,857,905 A * 1/1999 Uemura ............. B60H 1/00064
165/42
(Continued)

FOREIGN PATENT DOCUMENTS

DE  19963796 A1 * 7/2000 ......... B60H 1/00849
EP  1980432 A2 * 10/2008 ......... B60H 1/00471
(Continued)

OTHER PUBLICATIONS

Han, KR20040108454A English machine translation, Dec. 24, 2004.*
(Continued)

*Primary Examiner* — Edelmira Bosques
*Assistant Examiner* — Phillip Decker
(74) *Attorney, Agent, or Firm* — Morgan, Lewis & Bockius LLP

(57) ABSTRACT

Provided is an intake system of an air conditioning system for a vehicle, which is configured for simultaneously satisfying two conflict conditions of improving heating performance by increasing the inflow of inside air and of reducing the generation of moisture on a window glass, wherein a scroll case, in which a blower is mounted, is provided with a second partition member for dividing a passage, which is formed at an outlet port and includes a blower chamber around a blower fan, into an upper passage and a lower passage, and a flow guide for guiding air, which is separated by a first partition member and is introduced into the scroll
(Continued)

case from an inlet case, to the respective upper and lower passages.

16 Claims, 11 Drawing Sheets

(51) Int. Cl.
 *B60S 1/02* (2006.01)
 *B60S 1/54* (2006.01)
(52) U.S. Cl.
 CPC .......... *B60H 1/00678* (2013.01); *B60S 1/023* (2013.01); *B60S 1/54* (2013.01); *B60H 2001/00135* (2013.01); *B60H 2001/00607* (2013.01)
(58) Field of Classification Search
 USPC ........................................................ 454/127
 See application file for complete search history.

(56) References Cited

U.S. PATENT DOCUMENTS

| | | | |
|---|---|---|---|
| 5,876,277 A * | 3/1999 | Uemura | B60H 1/00849 454/139 |
| 6,782,944 B2 * | 8/2004 | Kim | B60H 1/00064 165/202 |
| 6,874,575 B2 * | 4/2005 | Kim | B60H 1/00064 165/204 |
| 2008/0253879 A1 * | 10/2008 | Kang | B60H 1/00471 415/98 |
| 2009/0025904 A1 * | 1/2009 | Tokunaga | B60H 1/00028 165/58 |
| 2010/0009620 A1 * | 1/2010 | Kawato | B60H 1/00685 454/241 |
| 2011/0250065 A1 * | 10/2011 | Liang | F04D 25/0613 415/212.1 |
| 2011/0287706 A1 * | 11/2011 | Maughan | F24F 13/08 454/329 |
| 2014/0045417 A1 * | 2/2014 | Sakamoto | B60H 1/00028 454/143 |
| 2016/0144688 A1 * | 5/2016 | Kim | B60H 1/00028 454/139 |
| 2016/0229258 A1 * | 8/2016 | Loup | B60H 1/00064 |
| 2018/0162191 A1 * | 6/2018 | Lee | B60H 1/00 |
| 2018/0162192 A1 * | 6/2018 | Lee | B60H 1/00 |
| 2018/0170146 A1 * | 6/2018 | Hoyle | B60H 1/00471 |
| 2018/0170147 A1 * | 6/2018 | Wright | B60H 1/00471 |

FOREIGN PATENT DOCUMENTS

| | | | |
|---|---|---|---|
| KR | 10-2004-0108454 A | | 12/2004 |
| KR | 10-2007-0066176 A | | 6/2007 |
| KR | 20090020884 A | * | 2/2009 |
| WO | WO 2014036207 A1 | * | 3/2014 ......... B60H 1/00021 |

OTHER PUBLICATIONS

Lee, KR20090020884A English machine translation, Feb. 27, 2009.*
Michel et al., DE19963796A1 English machine translation, Jun. 7, 2000.*

* cited by examiner

VEHICLE AIR CONDITIONING SYSTEM FOR SEPARATELY CONTROLLING FLOW OF INSIDE/OUTSIDE AIR

CROSS-REFERENCE TO RELATED APPLICATION

The present application claims priority to Korean Patent Application No. 10-2016-0117017 filed on Sep. 12, 2016, the entire contents of which is incorporated herein for all purposes by this reference.

BACKGROUND

Field of the Invention

The present invention relates to an air conditioning system for a vehicle. More particularly, it relates to an air conditioning system for a vehicle, which is capable of simultaneously satisfying two conflict conditions of improving heating performance by increasing the inflow of inside air and reducing the generation of moisture on a window glass.

Description of Related Art

As known in the art, vehicles are equipped with HVACs (Heating, Ventilation, and Air Conditioning systems) for regulating interior temperatures and creating pleasant indoor environments.

Such an HVAC cools or heats a vehicle interior by cooling or heating exterior air (outside air) introduced from the outside of the vehicle or interior air (inside air) circulated in the vehicle interior and supplying the same to the vehicle interior.

When a user sets a temperature in the HVAC, an air conditioning controller calculates an interior thermal load using information such as a quantity of solar radiation, an outside air temperature, and an interior temperature detected by sensors in order for the interior temperature to be controlled to a set temperature, and determines a discharge mode, a discharge temperature, a discharge direction, a volume of discharged air, etc. in consideration of an air conditioning load corresponding to the calculated thermal load.

The air conditioning controller controls operation elements, such as an actuator for each of an inside/outside air switching door (an air intake door), a temperature regulation door (a temperature door), a mode door (an air direction adjustment door), and the like, an air conditioning blower, and an air conditioning compressor, in order to control the supply of air-conditioned air according to the determined discharge mode, discharge temperature, discharge direction, and volume of discharged air.

In addition, air conditioning modes in an air conditioning system for a vehicle are classified into various modes according to air introduction and discharge methods. For example, the air conditioning modes are classified into an outside air mode, an inside air mode, etc. according to the air introduction method, and an inside/outside air switching door and an actuator therefor are used to control the inside and outside air modes.

The air conditioning modes are classified into a face mode (or called a vent mode), a floor (FLR) mode, a defrost (DEF) mode, a bi-level mode, etc. according to the air discharge method. To this end, a mode door for changing the flow path of air according to each mode is used.

In addition, the vents of the air conditioning system are classified into a face vent for discharging air toward the user's face and chest, a floor vent for discharging air toward the vehicle floor and driver's feet, a defrost vent for discharging air toward the windshield glass of the vehicle, and the like.

Meanwhile, the air conditioning system for a vehicle includes a blower unit for forcibly blowing inside/outside air to the air inlet port of an air conditioning case, the air conditioning case having the air inlet port into which the air blown from the blower unit is introduced and an air outlet port from which air is discharged, and an evaporator and a heater core which are installed in the air conditioning case.

In such a configuration, an inlet case at the upper side of the blower unit is equipped with a door for selectively opening and closing inside and outside air inlet ports, namely, with an inside/outside air switching door for controlling an inside air mode and an outside air mode.

In a typical air conditioning system for a vehicle, a controller (not shown) controls the position of the inside/outside air switching door according to the operation of a button or a switch so that the air introduced into the air conditioning system is controlled in an outside air mode or an inside air mode.

Meanwhile, in the case where the air conditioning system is controlled in the outside air mode during rapid heating in the winter season, air must be supplied to the vehicle interior after only cold air outside the vehicle is introduced and heated to be warm. For this reason, an air conditioning thermal load is increased and heating performance becomes inefficient.

On the other hand, even though the outside air mode is selected, when air is supplied to the vehicle interior after the interior warm air in the vehicle, i.e. a portion of inside air is introduced to be partially mixed with outside air and is then heated, it is possible to improve heating performance since a thermal load is reduced.

Accordingly, in order to reduce a thermal load and improve heating performance in the state in which the outside air mode is selected, when a heating load is high as during heating in the winter season, a portion of the outside air inlet port is closed such that a portion of inside air of whole heating air is mixed with outside air, and the inside/outside air switching door is positioned to open the inside air inlet port so that a portion of outside air is mixed with inside air.

This mode is referred to as a partial inside air mode (inside air mixing mode). When a heating load is equal to or higher than a certain level in the state in which the outside air mode is selected, the position of the inside/outside air switching door is changed by the controller such that inside air may be mixed in the partial inside air mode.

However, a conventional intake system has the following problems.

When a portion of inside air of whole heating air is mixed in the partial inside air mode (inside air mixing mode), moisture may be generated on the window glass of the vehicle.

In this case, when inside air is mixed in quantity, heating performance is improved by a reduction in air conditioning thermal load, whereas there is a high possibility of the generation of moisture on the window glass due to the deterioration of the ventilation performance in the vehicle interior.

This moisture generation is one of frequent problems relating to air conditioning. Increasing an amount of mixed inside air is advantageous to heating performance, but may cause the generation of moisture. Therefore, the amount of mixed inside air is limited to a preset level or less in order to minimize the generation of moisture.

Moreover, the amount of mixed inside air should be increased considering a decreasing trend of engine coolant heat source for heating in recent years, but the amount of mixed inside air is not increased due to concerns about the generation of moisture.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air conditioning system for a vehicle, which is capable of simultaneously satisfying two conflict conditions of improving heating performance by increasing the inflow of inside air and reducing the generation of moisture on a window glass.

In an exemplary embodiment, a vehicle air conditioning system for separately controlling flow of inside/outside air includes an air conditioning case having an upper vent for discharging air around a vehicle window glass and a lower vent for discharging air to a vehicle floor, a heater core and an evaporator mounted in the air conditioning case, an inlet case formed with an outside air inlet port and an inside air inlet port, a first partition member being mounted in the inlet case such that outside air and inside air introduced into the outside and inside air inlet ports flow in a separated state, a blower for drawing inside air and outside air through the inlet case, and a scroll case in which the blower is mounted, and to which the air drawn by the blower is supplied to the scroll case through an outlet port connected to an air inlet port of the air conditioning case. The scroll case is provided with a second partition member for dividing a passage, which is formed at the outlet port and includes a blower chamber around a blower fan, into an upper passage and a lower passage, and a flow guide for guiding the air, which is separated by the first partition member and is introduced into the scroll case from the inlet case, to the respective upper and lower passages.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
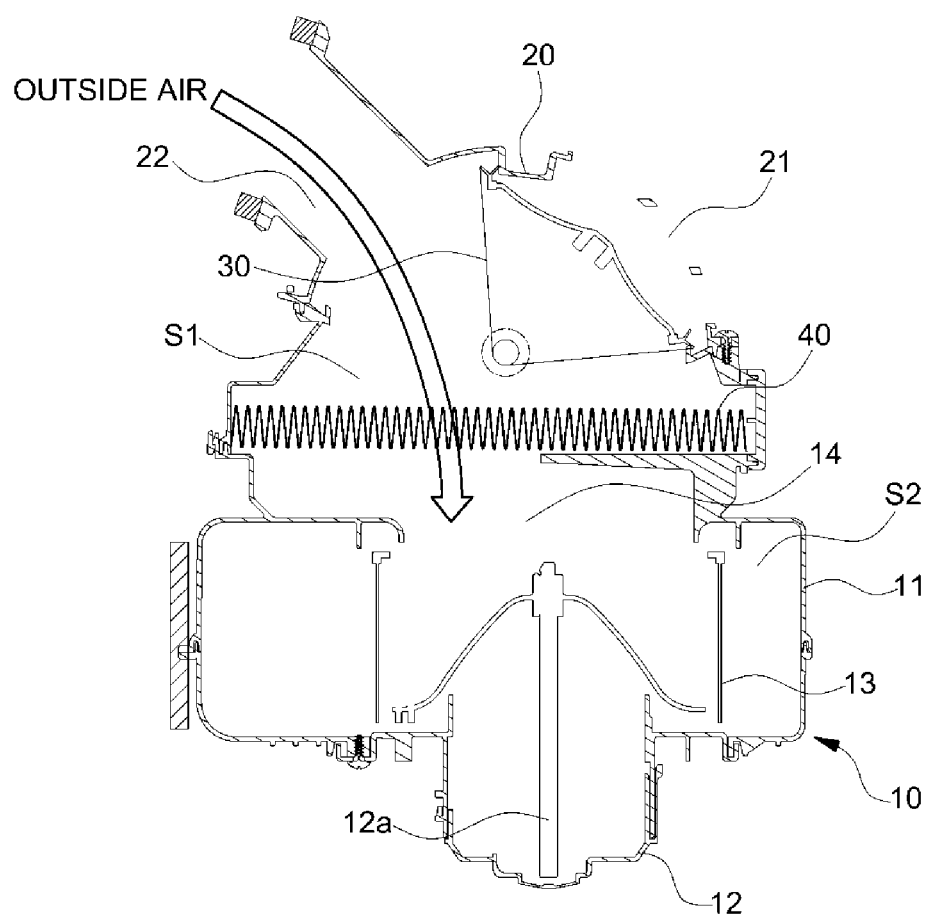
FIG. 1, FIG. 2, and FIG. 3 are cross-sectional views illustrating a conventional intake system including a blower unit, and illustrate the respective state of an inside air mode, an outside air mode, and a partial inside air mode.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the whole description, it will be understood that when a component is referred to as being "comprising" any component, it does not exclude other components, but can further comprises the other components unless otherwise specified.

A conventional intake system will be first described to help the understanding of the present invention.

Figure 2:
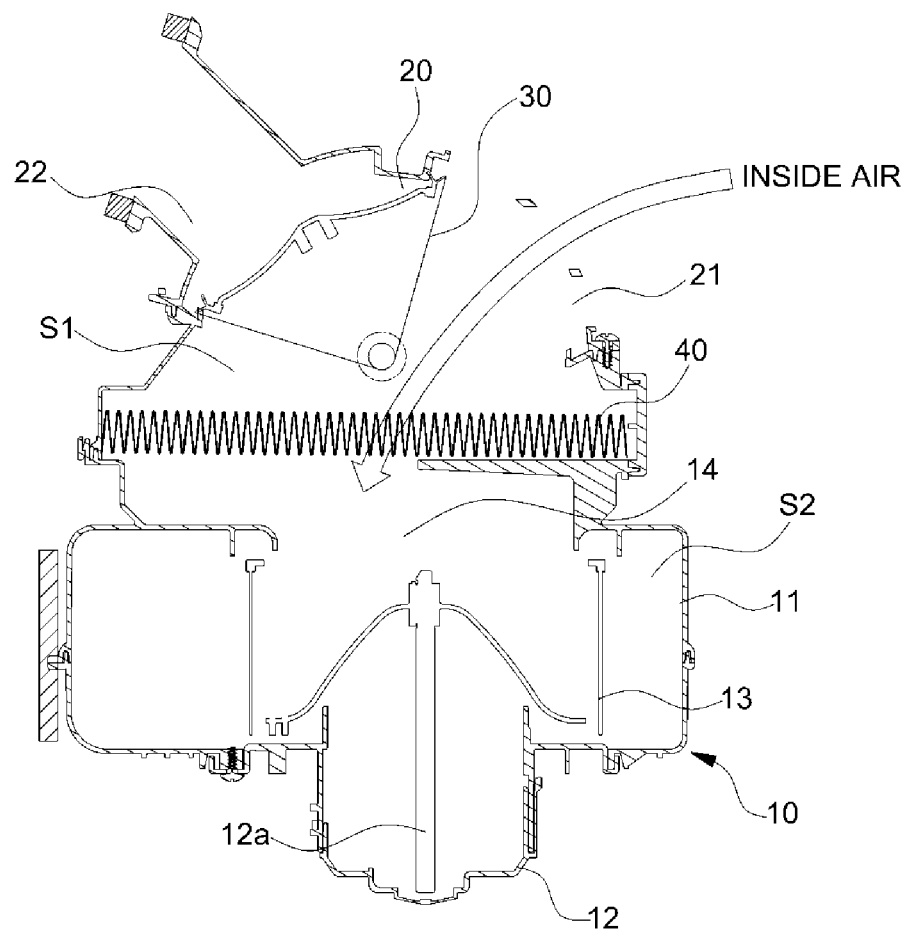
Figure 3:
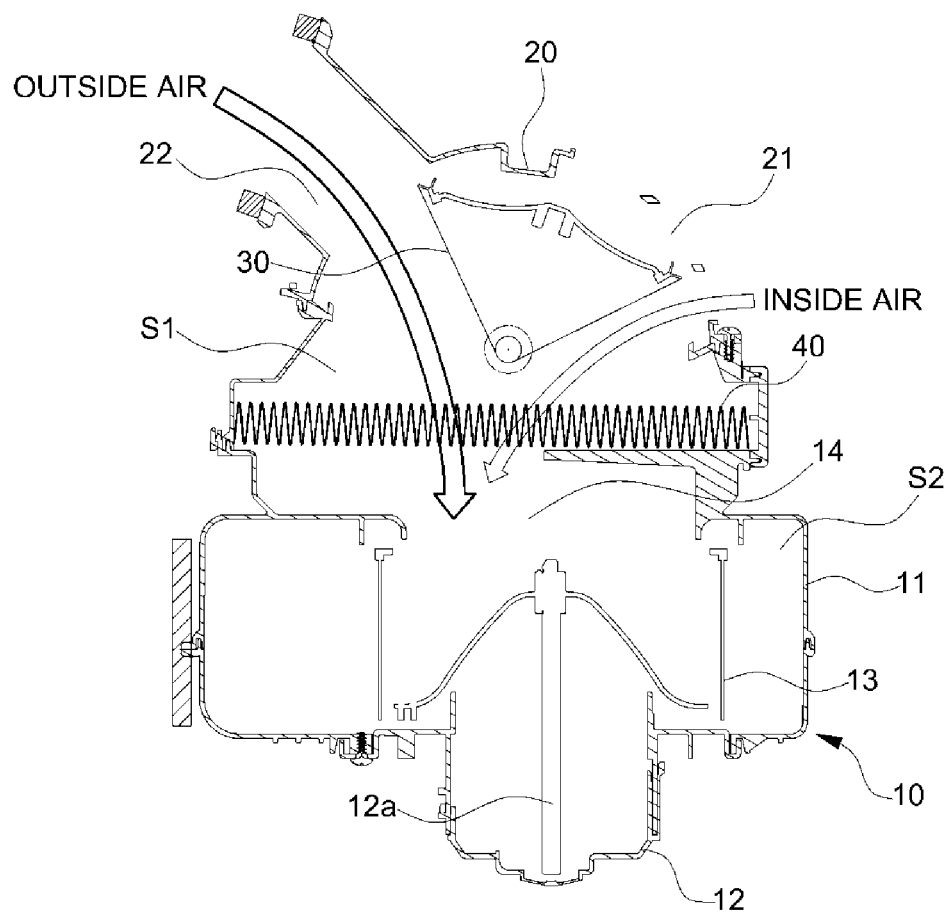

FIGS. 1 to 3 are cross-sectional views illustrating a conventional intake system including a blower unit. FIG. 1 illustrates the state of an outside air mode, FIG. 2 illustrates the state of an inside air mode, and FIG. 3 illustrates the state of a partial inside air mode.

As illustrated in the drawings, an upper inlet case 20 is formed with an inside air inlet port 21, an outside air inlet port 22, and an inlet chamber S1 which is an internal space. An inside/outside air switching door (air intake door) 30 for selectively opening or closing the inside and outside air inlet ports 21 and 22 is mounted in the upper inlet case 20.

In addition, a blower device 10 includes a scroll case 11, a blower motor 12, and a blower fan 13 which is mounted to a rotary shaft 12a of the blower motor 12. The scroll case 11 is mounted under the inlet case 20, and the blower fan 13 is rotatably disposed in the scroll case 11.

In addition, a blower chamber S2 is formed in the scroll case 11, and the blower chamber S2 is an internal space, and air is introduced into the blower chamber S2 from the inlet chamber S1 of the inlet case 20 by the rotation of the blower fan 13. When the blower fan 13 is rotated by the blower motor 12, the air introduced into the blower chamber S2 flows along the inside surface of the scroll case 11 by the rotation of the blower fan 13, and is then discharged through an outlet port.

The scroll case 11 has a suction port 14 formed in the upper portion thereof, and the inlet chamber S1 fluidically-communicates with the blower chamber S2 through the suction port 14. The upper side of the suction port 14 is provided with a filter 40 for filtering the air introduced into the blower chamber S2 from the inlet chamber S1.

Since the outlet port of the scroll case 11 is connected to the air inlet port of an air conditioning case, the air discharged through the outlet port may be introduced into the air conditioning case.

In a typical air conditioning system for a vehicle, a controller controls the air introduced into the air conditioning system in an outside air mode or an inside air mode according to the operation of a button or a switch.

Referring to FIG. 1, when the outside air mode is selected, an inside/outside air switching door 30, the driving of which is controlled by the controller, opens the outside air inlet port 22 and closes the inside air inlet port 21. Consequently, the outside air (outside air), which is introduced from the outside of the vehicle by the rotation of the blower fan 13, is supplied to the air conditioning case through the outlet port via the inlet chamber S1, the filter 40, the suction port 14, and the blower chamber S2.

On the other hand, as illustrating in FIG. 2, when the inside air mode is selected such that the air within the vehicle is circulated, the inside/outside air switching door 30 closes the outside air inlet port 22 and opens the inside air inlet port 21. Consequently, the inside air (inside air), which is introduced from the inside of the vehicle by the rotation of the blower fan 13, is supplied to the air conditioning case through the outlet port via the inlet chamber S1, the filter 40, the suction port 14, and the blower chamber S2.

In addition, when a heating load is high as during heating in the winter season, to reduce a thermal load and improve heating performance in the state in which the outside air mode is selected, in the partial inside air mode (inside air mixing mode), the inside/outside air switching door 30 is positioned to close a portion of the outside air inlet port 22 and open a portion of the inside air inlet port 21, as illustrated in FIG. 3, so that a portion of inside air of whole heating air is mixed with outside air.

However, when a portion of inside air of heating air is mixed with outside air in the partial inside air mode, moisture may be generated on the window glass of the vehicle.

Although the amount of mixed inside air is limited to a predetermined level or less to reduce the generation of moisture in the conventional air conditioning system, heating performance deteriorates when the amount of mixed inside air is reduced.

Various aspects of the present invention are directed to providing an air conditioning system for a vehicle, which is capable of simultaneously satisfying two conflict conditions of improving heating performance by increasing the inflow of inside air and reducing the generation of moisture on a window glass.

To this end, the air conditioning system for a vehicle according to an exemplary embodiment of the present invention is characterized in that the inside air and outside air introduced into an intake system may separately flow in the up and down directions.

In addition, the air conditioning system for a vehicle according to an exemplary embodiment of the present invention may separately control the flow of inside/outside air in the up and down directions in an outside air mode and in a heating operation condition of the winter season, so that outside air is discharged around the window glass and inside air used for main heating is discharged to a floor through a heater core.

In the outside air mode and in the heating operation condition of the winter season, outside air is discharged around the window glass through a face vent and a defrost vent, which are upper vents, to suppress the generation of moisture on the window glass, and heating air generated by heating inside air is discharged to the occupant feet in the vehicle floor through a foot vent, which is a lower vent, for heating, improving the heating performance of the vehicle.

In an exemplary embodiment of the present invention, the window glass may be a representative windshield glass, and the face vent and the foot vent may be vents for discharging cooling/heating air to the front seats (driver and passenger seats) of the vehicle.

The configuration of an air conditioning system according to an exemplary embodiment of the present invention will be described below in detail.

Figure 4:
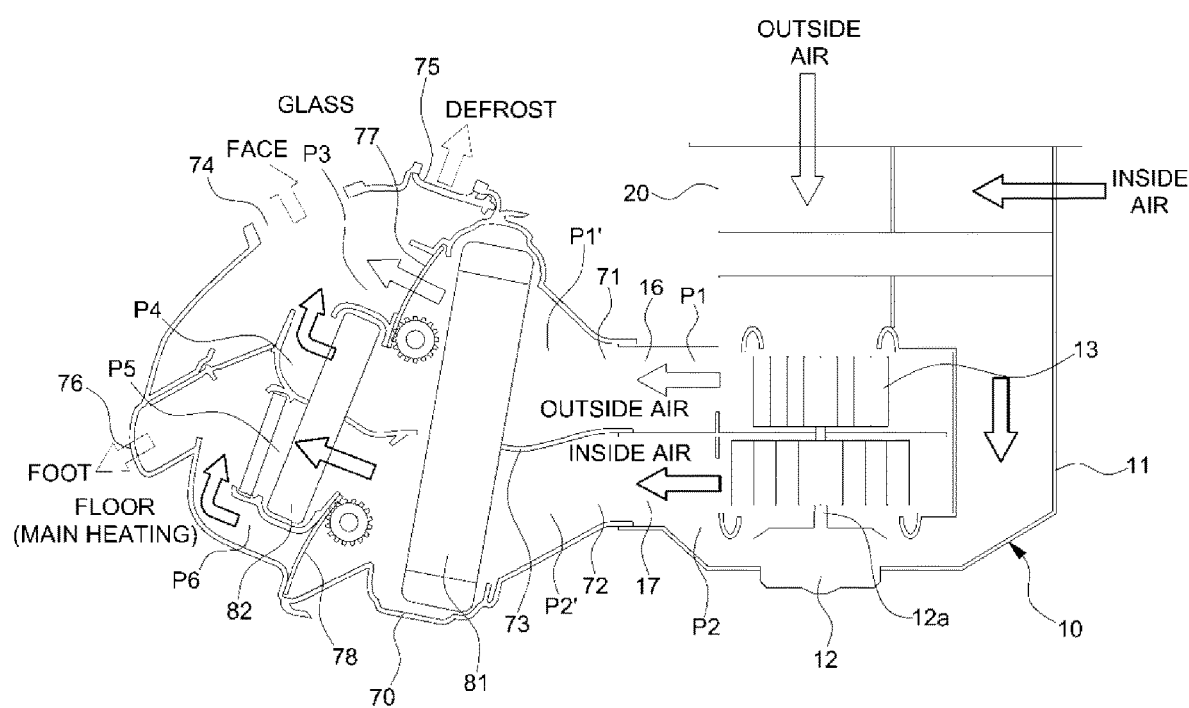
FIG. 4 is a view schematically illustrating the configuration of a vehicle air conditioning system an exemplary embodiment according to an exemplary embodiment of the present invention.

FIG. 4 is a cross-sectional view schematically illustrating the configuration of the air conditioning system according to the exemplary embodiment of the present invention to explain the concept of inside/outside air separation flow control.

Although FIG. 4 illustrates that a blower fan 13 is divided into an upper portion and a lower portion, this shape is merely illustrated for convenience' sake for explaining the concept of inside/outside air separation flow and vertical separation flow. A typical blower fan, which is not divided into an upper portion and a lower portion, may be used as well.

As illustrated in the drawing, in an intake system which includes an inlet case 20, a scroll case 11, and a blower fan 13, outside air and inside air may flow along respective paths while passing through the inlet case 20, the scroll case 11, and the blower fan 13 (the separation flow of inside/outside air).

That is, a passage in which outside air flows and a passage in which inside air flows are separated from each other such that outside air and inside air may be separated and flow in an inside/outside air separation flow mode to be described later.

In the instant case, in the exemplary embodiment illustrated in the drawing, outside air flows through an upper passage P1 formed in the intake system, and inside air flows through a lower passage P2 which is a passage separated from the upper passage P1 in the intake system.

In addition, the intake system includes a passage structure that separates the passages in which outside air and inside air flow.

That is, the internal space of the scroll case 11, in which the blower fan 13 is rotatably installed in the intake system, is divided into the upper passage P1 and the lower passage P2 by a flow guide 50 and a second partition member 60 which will be described later.

Accordingly, the outlet port of the scroll case 11 is divided into a first outlet port 16 connected to the upper passage P1, and a second outlet port 17 connected to the lower passage P2.

In addition, the first and second outlet ports 16 and 17 of the scroll case 11 are connected to first and second air inlet ports 71 and 72 of an air conditioning case 70, respectively. The upstream space, in which an evaporator 81 is located in the internal space of the air conditioning case 70, is also divided into an upper passage P1' and a lower passage P2' by a partition member 73.

The air conditioning case 70 is provided therein with first and second passages P3 and P4, which are connected to a face vent 74 and a defrost vent 75, and third and fourth passages P5 and P6 which are connected to a foot vent 76.

In addition, the upper passage P1' of the air conditioning case 70 is connected to the first and second passages P3 and P4, and the lower passage P2' of the air conditioning case 70 is connected to the third and fourth passages P5 and P6.

In addition, the air conditioning case 70 is provided therein with a first door 77 for selectively opening or closing the first and second passages P3 and P4, and a second door 78 for selectively opening or closing the third and fourth passages P5 and P6. Each of the first and second doors 77 and 78 may be a slide door.

When a gearing is rotated by the driving of an actuator including a motor, the doors 77 and 78 engaging with gears G1 and G2 of the gearing slide and selectively open and close the passage. Since the configuration of such a slide door is well known, a detailed description thereof will be omitted.

In addition, the air conditioning case 70 is provided therein with an evaporator 81 which is disposed downstream of the upper and lower passages P1' and P2' and upstream of the first to fourth passages P3 to P6. The air conditioning case 70 is provided therein with a heater core 82 which is disposed in the middle of the second and third passages P4 and P5.

Accordingly, the first passage P3 is a passage that passes through only the evaporator 81, the second and third passages P4 and P5 are passages that pass through both of the evaporator 81 and the heater core 82, and the fourth passage P6 is a passage that passes through only the evaporator 81.

As a result, the air supplied through the upper passage P1 and the first outlet port 16 of the scroll case 11 flows to the face vent 74 and the defrost vent 75 through the first or second passage P3 or P4 after passing through the evaporator 81.

However, when the first passage P3 is opened by the first door 77, air passes through only the evaporator 81, and then flows to the first passage P3 without passing through the heater core 82. When the second passage P4 is opened, air passes through the evaporator 81, and then flows to the first passage P3 after further passing through the heater core 82.

The air supplied through the lower passage P2 and the second outlet port 17 of the scroll case 11 flows to the foot vent 76 through the third or fourth passage P5 or P6 after passing through the evaporator 81.

In the instant case, when the third passage P5 is opened by the second door 78, air passes through the evaporator 81, and then flows to the third passage P5 after further passing through the heater core 82. When the fourth passage P6 is opened, air passes through only the evaporator 81, and then flows to the fourth passage P6 without passing through the heater core 82.

In the air conditioning system according to an exemplary embodiment of the present invention, a controller controls the position of the first door 77 to open the second passage P4 during heating, and controls the position of the first door 77 to close the second passage P4 and open the first passage P3 in the air conditioning mode except for the heating, e.g. during cooling (the operation of an air conditioner).

In addition, the controller controls the position of the second door 78 to open the third passage P5 during heating, and controls the position of the second door 78 to close the third passage P5 and open the fourth passage P6 in the air conditioning mode except for the heating, e.g. during cooling (the operation of the air conditioner).

Meanwhile, when a user selects one of inside and outside air modes by operating a button or a switch in the air conditioning system according to an exemplary embodiment of the present invention, the controller recognizes the operation state by the user and controls the inside and outside air modes.

However, even though the user selects the outside air mode in the heating condition of the winter season, e.g. when the heating load of the vehicle is equal to or higher than a predetermined level, the inside/outside air separation flow mode, in which inside air and outside air are simultaneously introduced and then supplied in separated state, is controlled.

This inside/outside air separation flow mode is a mode during heating, and the first and second doors 77 and 78 are therefore controlled as during heating described above.

For example, three modes including the inside air mode, the outside air mode, and the inside/outside air separation flow mode which is a mode during heating, are performed in the air conditioning system according to an exemplary embodiment of the present invention. Therefore, although the user may select one of the inside and outside air modes, only one of the three modes may be actually performed.

When the user selects the outside air mode, only outside air, which is introduced through the outside air inlet port of the inlet case 20 by the driving of the blower fan 13, is supplied to the air conditioning case 70 through the scroll case 11 (all outside air mode). When the user selects the inside air mode, only inside air, which is introduced through the inside air inlet port of the inlet case by the driving of the blower fan, is supplied to the air conditioning case through the scroll case (all inside air mode).

However, in the heating condition of the winter season in which the user selects the outside air mode and the heating load is equal to or higher than a predetermined level, the outside air introduced through the outside air inlet port of the inlet case 20 and the inside air introduced through the inside air inlet port flow through the inlet case 20, the scroll case 11, the separated passages in the air conditioning case 70 (inside/outside air separation flow). In the instant case, outside air is discharged around the window glass through the face vent 74 and the defrost vent 75 which are upper vents of the air conditioning case 70, and inside air is discharged to the floor through the foot vent 76 which is a lower vent.

In the instant case, heating is mainly performed by the air discharged through the foot vent 76 after passing through the lower passage P2'. Accordingly, the lower passage P2' and the foot vent 76, through which inside air passes, are used for main heating.

Thus, in the heating condition of the winter season, outside air is discharged around the upper window glass, and inside air for main heating is discharged to the lower floor and passenger feet. Therefore, it is possible to suppress the generation of moisture on the window glass and simultaneously increase the inflow of inside air used for heating to enhance the heating performance of the vehicle.

The inside/outside air separation flow mode is a mode performed in the heating condition of the winter season in which the user selects the outside air mode and the heating load is equal to or higher than a predetermined level, and a mode corresponding to the conventional partial inside air mode (inside air mixing mode). Since the inside/outside air separation flow mode is a mode performed in the outside mode and the heating condition of the winter season, there is no difference between the inside/outside air separation flow mode and the conventional partial inside air mode in an operation condition.

Hereinafter, the configuration of the intake system of the air conditioning system for a vehicle according to the exemplary embodiment of the present invention will be described in detail.

Figure 5:
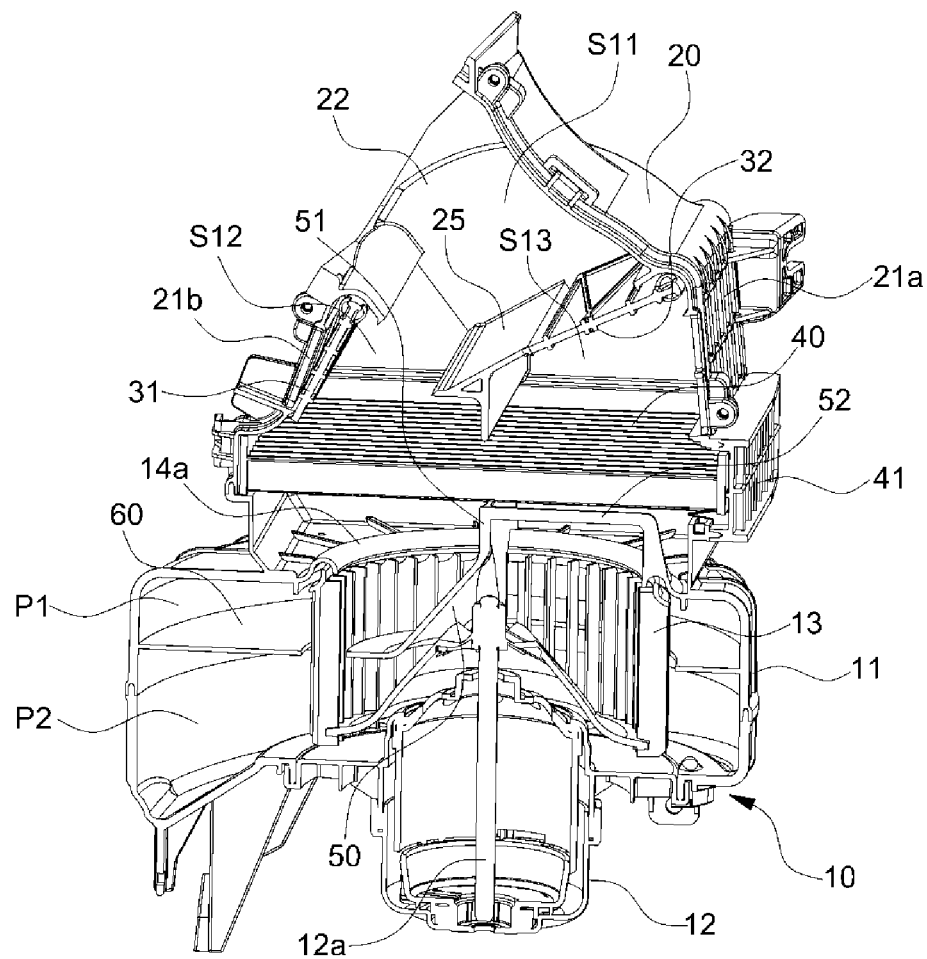
FIG. 5 is a cut perspective view illustrating an intake system of the vehicle air conditioning system according to the exemplary embodiment of the present invention.
Figure 6:
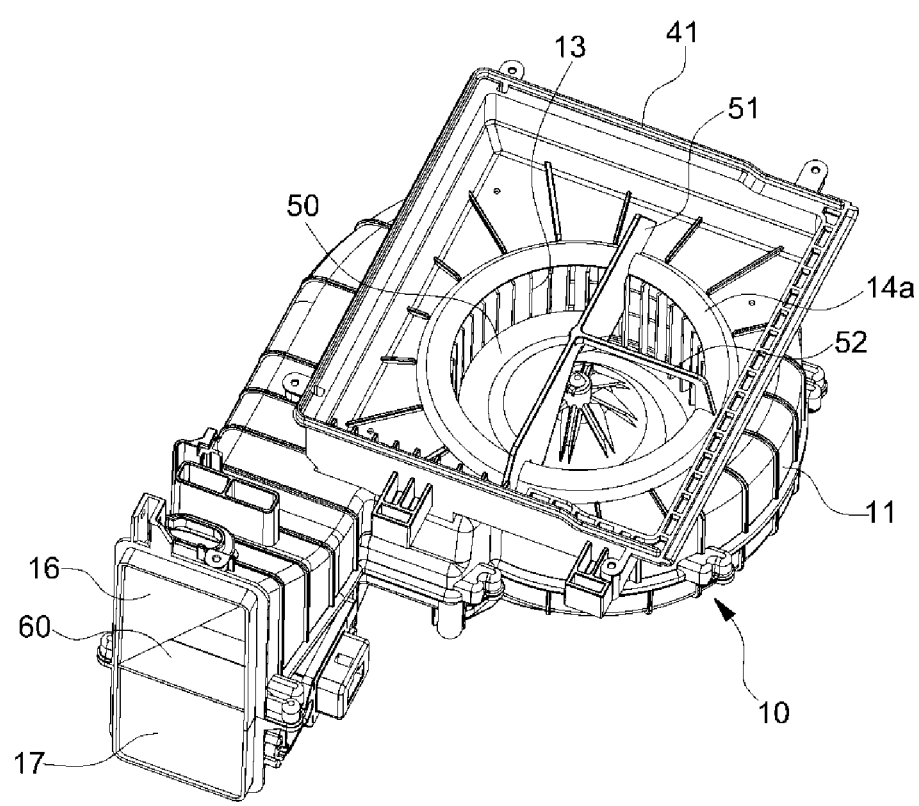
FIG. 6 is a top perspective view illustrating the intake system of the vehicle air conditioning system according to the exemplary embodiment of the present invention.

FIG. 5 and FIG. 6 are perspective views illustrating an intake system of the vehicle air conditioning system according to the exemplary embodiment of the present invention. FIG. 6 is a perspective view illustrating the state in which an inlet case and a filter are removed from the intake system.

As illustrated in the drawings, the intake system includes an inlet case 20 and a filter case 41 which are disposed at the upper side thereof, and a scroll case 11 which is disposed at the lower side thereof. The inlet case 20, the filter case 41, and the scroll case 11 are provided as an integral case made by assembling them.

In the instant case, the inlet case 20 and the filter case 41 may be integrally or monolithically formed, and the scroll case 11 is assembled under the inlet case 20 through the filter case 41.

In addition, a filter 40 is mounted in the filter case 41.

Inlet chambers S11, S12, and S13 are formed in the inlet case 20, and the inlet case 20 is provided with a first partition member 25 which separates the flow of the air introduced into the upstream inlet chamber S11 located at the upper side of the filter 40.

The first partition member 25 serves to divide an inlet chamber, which is the internal space of the inlet case 20, into the upstream inlet chamber S11 and the downstream inlet chambers S12 and S13, and serves to divide a downstream inlet chamber, which is the air introduction space located at the upper side of the scroll case 11, into two passages, i.e. a first introduction passage S12 and a second introduction passage S13.

The first partition member 25 is formed with two introduction ports, through which outside air is introduced into the downstream inlet chambers S12 and S13, i.e. a first introduction port 24 which is the inlet of the first introduction passage S12 and a second introduction port 23 which is the inlet of the second introduction passage S13.

In addition, the inlet case 20 is formed with an outside air inlet port 22 and two inside air inlet ports 21a and 21b. The first inside air inlet port 21b, which is one of the two inside air inlet ports, may be mounted adjacent to the outside air inlet port 22, and the second inside air inlet port 21a, which is the remaining one of the two inside air inlet ports, may be formed opposite to the first inside air inlet port 21b.

The outside air inlet port 22 is connected to the upstream inlet chamber S11, and the first and second inside air inlet ports 21b and 21a are connected to the downstream inlet chambers S12 and S13.

In the instant case, the first inside air inlet port 21b is connected to the first introduction passage S12, and the second inside air inlet port 21a is connected to the second introduction passage S13.

In addition, the inlet case 20 is provided therein with a first switching door 31 for selectively opening or closing the first inside air inlet port 21b and the first introduction port 24, and a second switching door 32 for selectively opening or closing the second inside air inlet port 21a and the second introduction port 23.

Each of the first and second switching doors 31 and 32 may be a typical rotary door which opens and closes ports by rotating when the actuator controlled by the controller is driven. The first switching door 31 serves to open the first inside air inlet port 21b and close the first introduction port 24, or serves to close the first inside air inlet port 21b and open the first introduction port 24 by the control of the controller.

In addition, the second switching door 32 serves to open the second inside air inlet port 21a and close the second introduction port 23, or serves to close the second inside air inlet port 21a and open the second introduction port 23 by the control of the controller.

Meanwhile, a blower device 10 includes the scroll case 11 and a blower. The blower includes a blower motor 12, and a blower fan 13 which is mounted to a rotary shaft 12a of the blower motor 12 and is rotatably disposed in the scroll case 11.

In addition, the scroll case 11 has a suction port 14 (see FIG. 7) formed in the upper portion of the scroll case 11, and the inlet chamber of the inlet case 20 fluidically-communicates with a blower chamber, which is the internal space of the scroll case 11, through the suction port 14.

The suction port 14 is located between the filter 40 and the blower fan 13. A flow guide 50 is mounted in the suction port 14 to respectively guide the air introduced through the first introduction passage S12 among the downstream inlet chambers S12 and S13 of the inlet case 20 and the air introduced through the second introduction passage S13 to the upper and lower passages P1 and P2 of the blower chamber in a separated state.

The flow guide 50 is a member having a plate shape as a whole. The flow guide 50 has a plate shape such that it extends inward of the blower fan 13 from an annular ring part 14a forming the edge portion of the suction port 14 in the scroll case 11 to form a vertical section, and then the lower end portion thereof extends radially and horizontally toward the blower fan 13 to form a straight section and a horizontal section, wherein a first end of the straight section is connected to the vertical section with an obtuse angle.

In the instant case, the lower end portion of the flow guide 50, which horizontally extends to form the horizontal section to which a second end of the straight section is connected with respect to the horizontal section with an obtuse angle, is disposed flush with a second partition member. In the exemplary embodiment, the lower end portion may have a shape that extends horizontally from the center of the vertical height of the blower fan 13.

The flow guide 50 is fixed such that an upper end portion 51 traverses the suction port 14 and both tips of the upper end portion 51 are fixedly coupled with both sides of the ring part 14a. The intermediate portion of the upper end portion 51 is formed with a separate support part 52 which extends to the ring part 14a so that the end portion of the support part 52 is fixedly coupled with the ring part 14a.

In the instant case, the amount of air distributed to the upper and lower passages P1 and P2 of the blower chamber, i.e. the distribution amount of air to the upper and lower passages P1 and P2 depends on a position at which the upper end portion 51 of the flow guide 50 splits the area of the suction port 14.

Accordingly, the upper end portion 51 of the flow guide 50 may be disposed to be integral with the case according to a position at which the area of the suction port 14 is split such that the volume of air in the upper and lower passages P1 and P2 may be properly distributed.

By way of example, the upper end portion 51 of the flow guide 50 may be disposed according to a position at which the area of the suction port 14 is split into substantially one-half, as illustrated in FIG. 6.

That is, the upper end portion 51 of the flow guide 50 may be, for example, disposed to rectilinearly pass through the center of the suction port 14 having a circular shape, but the present invention is not limited thereto.

In the instant case, the support part 52 may be elongated radially to the ring part 14a from the intermediate portion of the upper end portion 51 of the flow guide 50, which corresponds to the center of the suction port 14.

The upper end portion 51 and the support part 52 of the flow guide 50 form a "T" shape as a whole. Since the intermediate portion of the flow guide 50 has a semicircular funnel shape that extends downward and obliquely from the upper end portion 51, the flow guide 50 extends horizontally toward the blower fan 13 from the lower edge portion of the intermediate portion.

The upper end portion 51 and the support part 52 of the flow guide 50, which form a "T" shape, protrude upward from the ring part 14a forming the suction port 14 of the scroll case 11 by a predetermined height.

Consequently, the upper end portion 51 of the flow guide 50 serves to separate the flow of air and simultaneously serves to support the upper filter 40 together with the support part 52.

Meanwhile, the blower fan 13 is rotatably disposed in the scroll case 11, and the blower chamber, into which air is introduced from the inlet case 20 by the rotation of the blower fan, is formed around the blower fan 13.

In addition, the second partition member 60 which divides the internal space of the blower chamber into upper and lower portions is mounted in the blower chamber. The second partition member 60 divides the blower chamber into the upper passage P1 and the lower passage P2, and is mounted to divide the entirety of the internal space of the scroll case 11 to the position of the outlet port together with the blower chamber, which is a space around the blower fan 13, into the upper passage P1 and the lower passage P2.

Thus, the outlet port of the scroll case 11 is divided into two outlet ports 16 and 17 by the second partition member 60. Hereinafter, the outlet port of the upper passage P1 is referred to as a first outlet port 16, and the outlet port of the lower passage P2 is referred to as a second outlet port 17.

Figure 7:
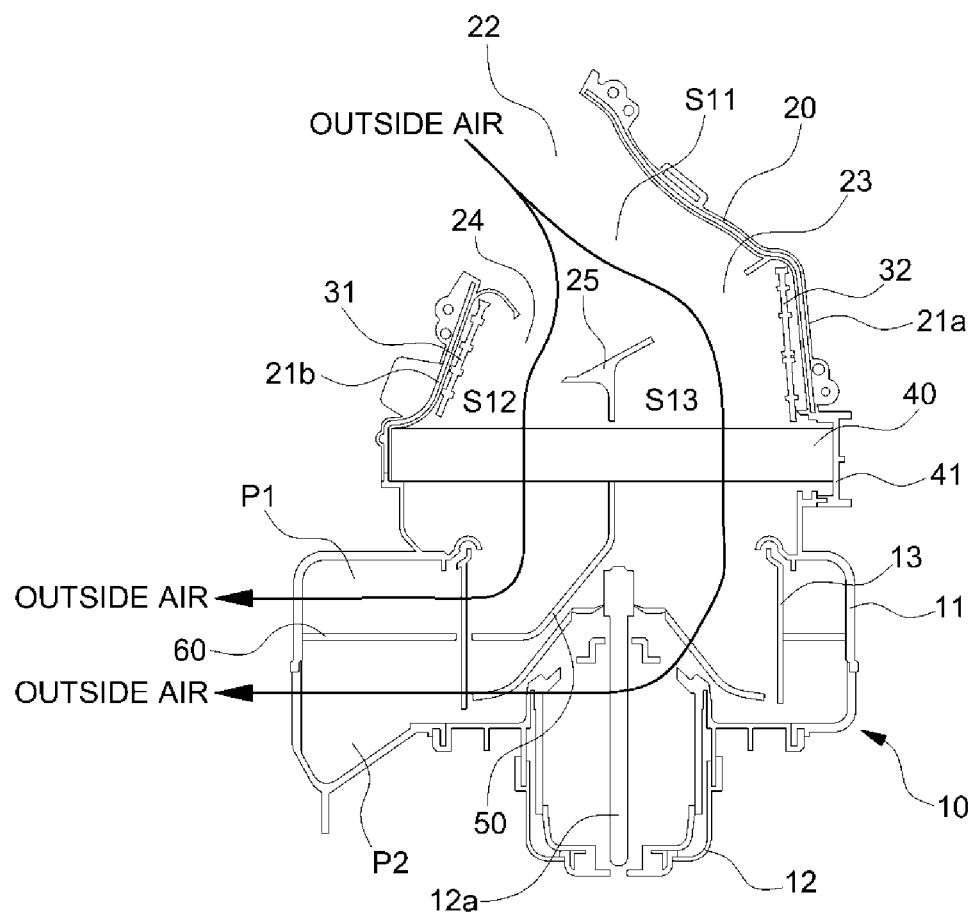
FIG. 7 is a cross-sectional view illustrating the intake system of the vehicle air conditioning system according to the exemplary embodiment of the present invention.
Figure 8:
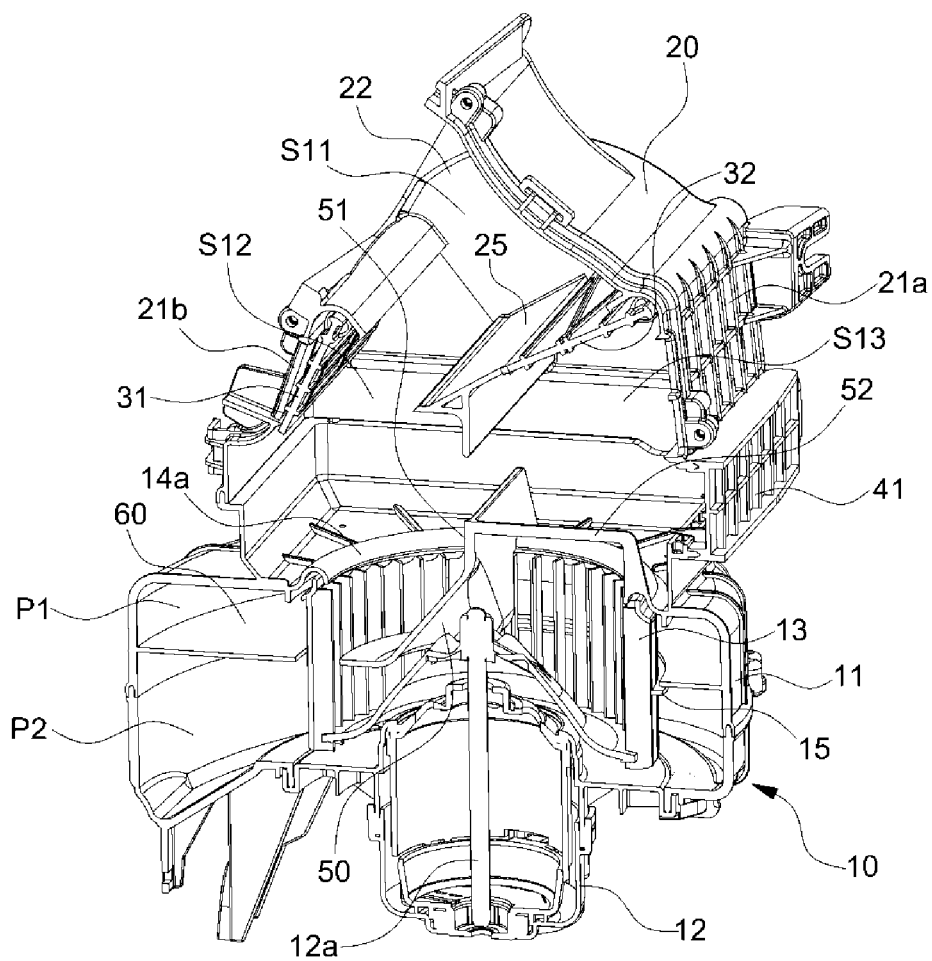
FIG. 8 is a cut perspective view illustrating an intake system having blocking protrusions according to another exemplary embodiment of the present invention.
Figure 9:
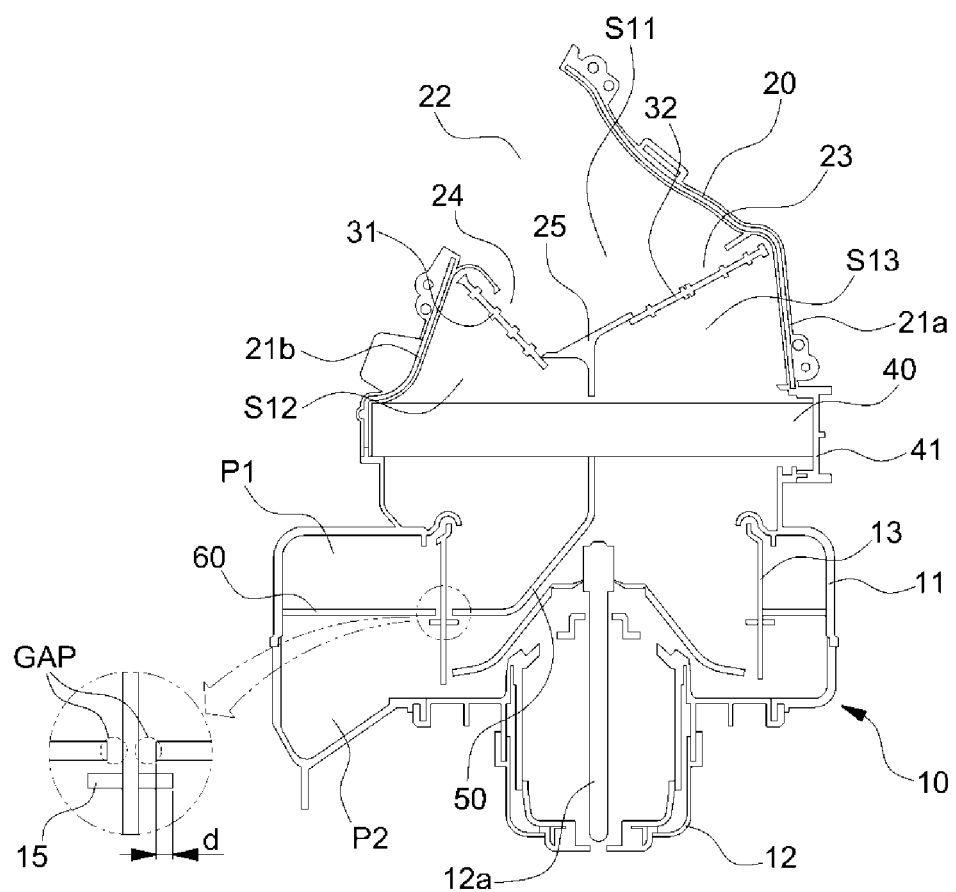
FIG. 9 is a cross-sectional view illustrating the intake system having the blocking protrusions according to another exemplary embodiment of the present invention.

FIG. 7 is a cross-sectional view illustrating the intake system of the vehicle air conditioning system according to the exemplary embodiment of the present invention. FIGS. 8 and 9 are a perspective view and a cross-sectional view illustrating an intake system having blocking protrusions according to another exemplary embodiment of the present invention.

The edge portion of the lower end portion of the flow guide 50 has a predetermined gap with the inside surface of the blower fan 13 in the state in which the flow guide 50 is inserted and mounted into the blower fan 13. In addition, the inner peripheral edge portion of the second partition member 60 has a predetermined gap with an outside surface of the blower fan 13.

Thus, the blower fan 13 may rotate without contact, collision, and interference with the flow guide 50 and the second partition member 60.

As illustrated in FIGS. 8 and 9, to prevent air from being mixed through the gap between the upper and lower passages P1 and P2 divided by the flow guide 50 and the second partition member 60, blocking protrusions 15 may be formed on the inner and outer surfaces of the blower fan 13 to clog the gap.

The respective blocking protrusions 15 are continuously elongated in a circumferential direction on the inner and outer surfaces. As illustrated in FIG. 9, at least a portion of the blocking protrusions 15 is preferably formed in a vertically overlapped shape in the state in which it is spaced apart from the edge portion of the lower end portion of the flow guide 50 and the inner peripheral edge portion of the second partition member 60.

Hereinafter, the operation of the air conditioning system according to the mode thereof will be described with reference to FIGS. 4, 7, 10, and 11.

Figure 10:
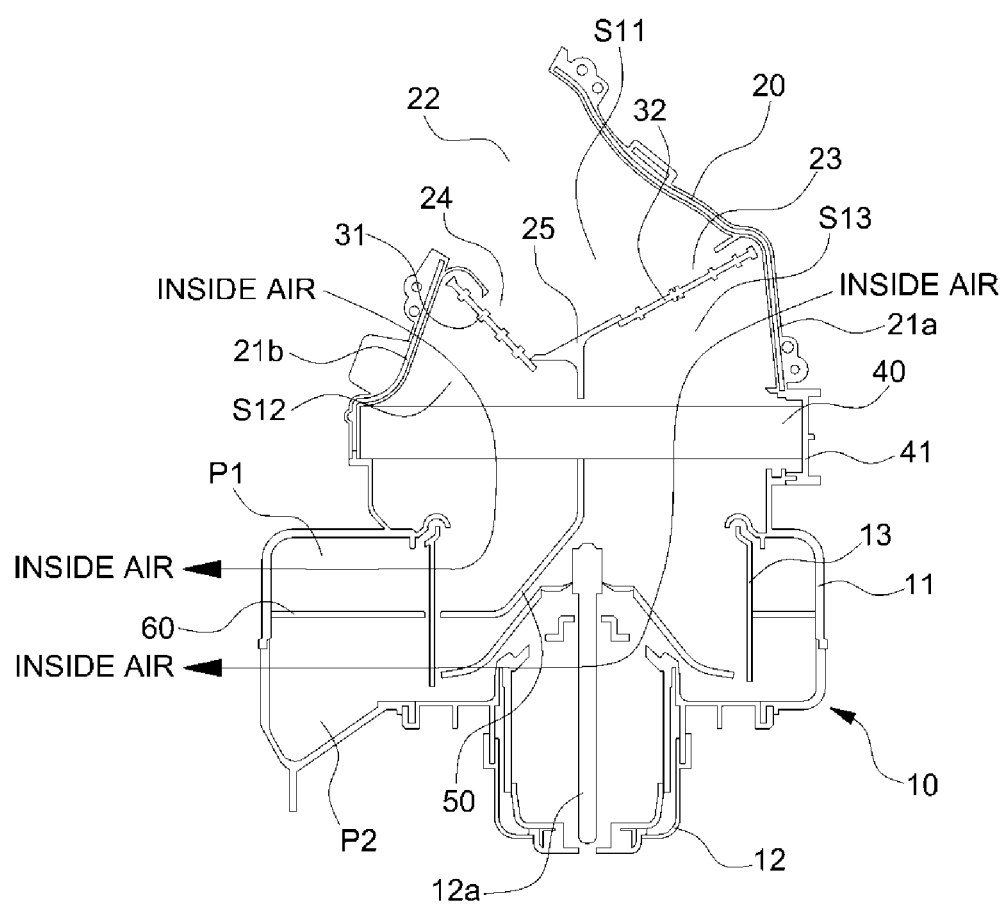
FIG. 10 is a view illustrating a state in which the vehicle air conditioning system according to the exemplary embodiment of the present invention is operated in an inside air mode.
Figure 11:
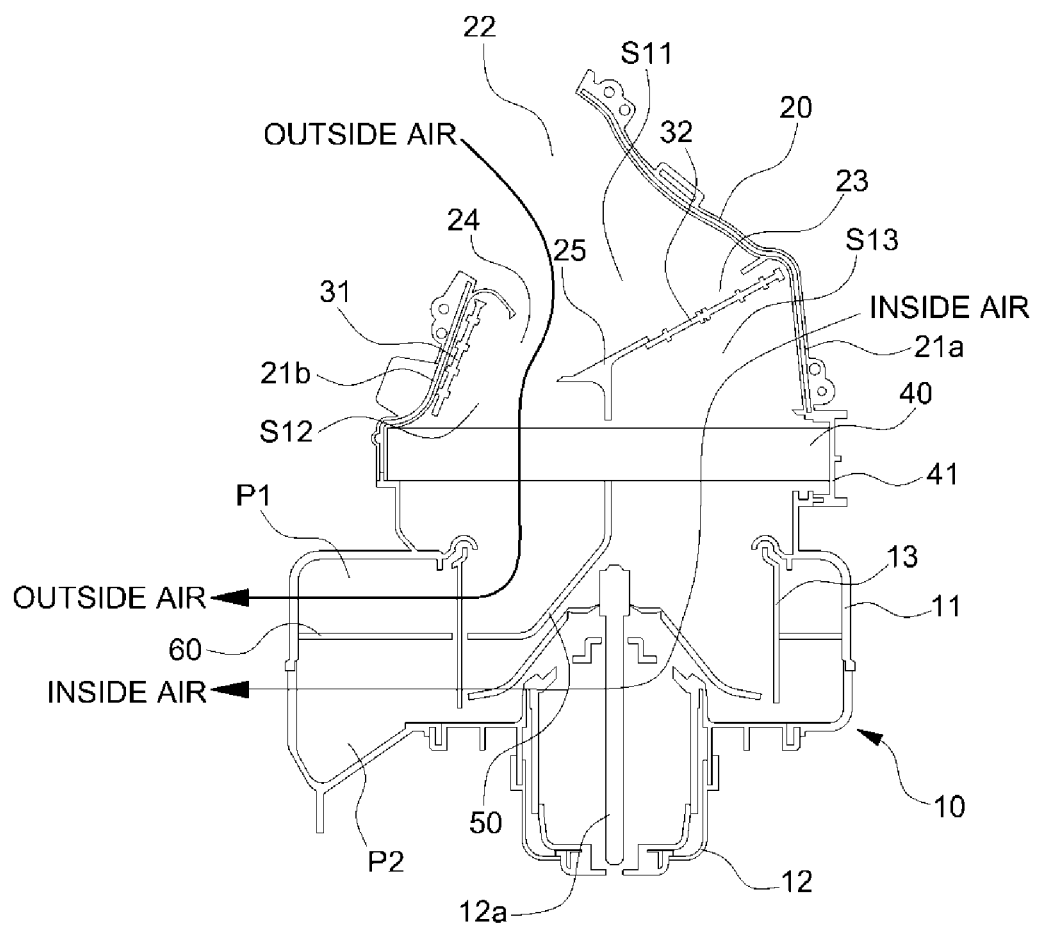
FIG. 11 is a view illustrating a state in which the vehicle air conditioning system according to the exemplary embodiment of the present invention is operated in an inside/outside air separation flow mode.

FIG. 7 illustrates the state of the outside air mode, FIG. 10 illustrates the state of the inside air mode, and FIG. 11 illustrates the state of the inside/outside air separation flow mode.

First, when the driver selects the outside air mode, the controller determines whether the thermal load is in the heating condition of the winter season, which is equal to or higher than a predetermined level. When the thermal load is not in the heating condition of the winter season, the outside air mode in which only outside air is supplied to the air conditioning case 70 (see FIG. 4) is controlled as illustrated in FIG. 7.

In the instant case, the first switching door 31 is controlled to close the first inside air inlet port 21b and open the first introduction port 24, and the second switching door 32 is controlled to close the second inside air inlet port 21a and open the second introduction port 23.

When the blower fan 13 is rotated by the driving of the blower motor 12, only outside air is introduced into the upstream inlet chamber S11, and is then branched into and flows in the first and second introduction passages S12 and S13 of the downstream inlet chamber through the first and second introduction ports 24 and 23.

The air flowing along the first introduction passage S12 flows along the passage above the flow guide 50 after passing through the filter 40, and then flows to the first outlet port 16 after flowing along the passage P1 above the second partition member 60, i.e. the upper passage P1 of the blower chamber.

On the other hand, the air flowing along the second introduction passage S13 passes through the filter 40, and then flows to the second outlet port 17 after flowing along the passage P2 under the second partition member 60, i.e. the lower passage P2 of the blower chamber through the space under the flow guide 50.

Accordingly, the air supplied to the air conditioning case 70 through the first outlet port 16 after flowing along the upper passage P1 is discharged around the window glass through the face vent 74 and the defrost vent 75 (see FIG. 4), as described with reference to FIG. 4.

In addition, the air supplied to the air conditioning case 70 through the second outlet port 17 after flowing along the lower passage P2 is discharged around the floor through the foot vent 76, as described with reference to FIG. 4.

Since only outside air is supplied to the vehicle inside in the outside air mode, moisture is not generated on the window glass.

Next, when the driver selects the inside air mode, the controller controls the inside air mode in which only inside air is supplied to the air conditioning case 70 (see FIG. 4), as illustrated in FIG. 10.

In the instant case, the first and second switching doors 31 and 32 are controlled by the controller to open the first and second inside air inlet ports 21b and 21a and close the first and second introduction ports 24 and 23 to introduce only inside air without the introduction of outside air.

When the blower fan 13 is rotated by the driving of the blower motor 12, only inside air is introduced into the first and second introduction passages S12 and S13 of the downstream inlet chamber through the first and second inside air inlet ports 21b and 21a.

In the instant case, the air introduced into the first introduction passage S12 flows along the passage above the flow guide 50 after passing through the filter 40, and then flows to the first outlet port 16 after flowing along the passage P1 above the second partition member 60, i.e. the upper passage P1 of the blower chamber.

In addition, the air introduced into the second introduction passage S13 passes through the filter 40, and then flows to the second outlet port 17 after flowing along the passage P2 under the second partition member 60, i.e. the lower passage P2 of the blower chamber through the space under the flow guide 50.

Accordingly, the air supplied to the air conditioning case 70 through the first outlet port 16 after flowing along the upper passage P1 is discharged around the window glass through the face vent 74 and the defrost vent 75, as described above.

In addition, the air supplied to the air conditioning case 70 through the second outlet port 17 after flowing along the lower passage P2 is discharged around the floor through the foot vent 76, as described above.

Next, when the thermal load is determined to be in the heating condition of the winter season, which is equal to or higher than a predetermined level in the state in which the driver selects the outside air mode, the controller controls the inside/outside air separation flow mode.

That is, the first switching door 31 is controlled to open the first introduction port 24 and close the first inside air inlet port 21b, and the second switching door 32 is controlled to close the second introduction port 23 and open the second inside air inlet port 21a, as illustrated in FIG. 11.

When the blower fan 13 is rotated by the driving of the blower motor 12, outside air is introduced into the upstream inlet chamber P11 through the outside air inlet port 22, and then flows in the first introduction passage S12 of the downstream inlet chamber through the first introduction port 24.

The outside air flowing along the first introduction passage S12 flows along the passage above the flow guide 50 after passing through the filter 40, and then flows to the first outlet port 16 after flowing along the passage P1 above the second partition member 60, i.e. the upper passage P1 of the blower chamber.

At the same time, the inside air, which is introduced into the second introduction passage S13 through the second inside air inlet port 21a and flows along the second introduction passage S13, passes through the filter 40, and then flows to the second outlet port 17 after flowing along the passage P2 under the second partition member 60, i.e. the lower passage P2 of the blower chamber through the space under the flow guide 50.

Accordingly, the outside air supplied to the air conditioning case 70 through the first outlet port 16 after flowing along the upper passage P1 is discharged around the window glass through the face vent 74 and the defrost vent 75. The inside air supplied to the air conditioning case 70 through the second outlet port 17 after flowing along the lower passage P2 is discharged around the floor through the foot vent 76.

As a result, the inside air discharged through the second outlet port 17 is heated while passing through the heater core 82 in the air conditioning case 70, and is then supplied to the vehicle inside, performing heating (main heating) (see FIG. 4). In the instant case, since the outside air, which is branched by the flow guide 50 and then passes through the upper passage P1, is discharged around the window glass after passing through the air conditioning case 70, the generation of moisture on the window glass may be suppressed.

In the instant case, since the inflow of inside air used for heating is significantly increased, the heating performance may be enhanced.

As is apparent from the above description, in accordance with an air conditioning system for a vehicle of the present invention, in an outside air mode and in a heating condition of the winter season, outside air is discharged around a window glass through a face vent and a defrost vent, to suppress the generation of moisture on the window glass, and heating air generated by heating inside air is discharged to the occupant feet in a vehicle floor through a foot vent for heating, improving the heating performance of a vehicle.

That is, the inflow of inside air can be increased by controlling inside/outside air in an inside/outside air separation flow mode in the outside air mode and in the heating condition of the winter season, with the consequence that it is possible to enhance heating performance and simultaneously reduce the generation of moisture on the window glass.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "interior", "exterior", "inner," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle air conditioning system for separately controlling flow of inside air and outside air, comprising:
    an inlet case formed with an outside air inlet port and an inside air inlet port, a first partition member being mounted in the inlet case, wherein the outside air and the inside air introduced into the outside and inside air inlet ports flow in a separated state;
    a blower for drawing the inside air and the outside air through the inlet case; and
    a scroll case in which the blower is mounted, the air drawn by the blower being supplied to the scroll case through an outlet port connected to an air inlet port of an air conditioning case, wherein the scroll case is provided with:
    a second partition member for dividing a passage, which is formed at the outlet port and includes a blower chamber around a blower fan, into an upper passage and a lower passage; and
    a flow guide for guiding the air, which is separated by the first partition member and is introduced into the scroll case from the inlet case, to the respective upper and lower passages, and
    wherein the flow guide is a member having a plate shape, and has a shape that extends inward of the blower fan from an annular ring part forming an edge portion of a suction port in the scroll case, and then extends radially and horizontally toward the blower fan,
    wherein an upper end portion of the flow guide has two laterally extending tips, wherein both tips are fixedly coupled with a first side and second side of the ring part in a state in which the upper end portion of the flow guide traverses the ring part, and the flow guide has a support part elongated to the ring part from the upper end portion of the flow guide, and
    wherein the upper end portion and the support part of the flow guide protrude upwards from the ring part by a predetermined height which is greater than zero to support a filter disposed thereabove.

2. The vehicle air conditioning system of claim 1, wherein the first partition member divides an internal space of the inlet case into an upstream inlet chamber connected to the outside air inlet port, and a downstream inlet chamber connected to the inside air inlet port and a suction port of the scroll case; and
    the first partition member is mounted to divide the downstream inlet chamber into a first introduction passage connected to the upper passage of the scroll case, and a second introduction passage connected to the lower passage of the scroll case.

3. The vehicle air conditioning system of claim 2, wherein the first partition member is formed with a first introduction port which is an inlet of the first introduction passage, and a second introduction port which is an inlet of the second introduction passage; and
    the inlet case is formed with the outside air inlet port connected to the upstream inlet chamber, a first inside air inlet port connected to the first introduction passage, and a second inside air inlet port connected to the second introduction passage.

4. The vehicle air conditioning system of claim 3, wherein the inlet case is provided with a first switching door for selectively opening or closing the first inside air inlet port and the first introduction port, and a second switching door for selectively opening or closing the second inside air inlet port and the second introduction port.

5. The vehicle air conditioning system of claim 4, wherein the first and second switching doors are controlled to open the first and second inside air inlet ports and close the first and second introduction ports to introduce only the inside air without introduction of the outside air, in an inside air mode; and
    the first switching door is configured to be controlled to close the first inside air inlet port and open the first introduction port, and the second switching door is configured to be controlled to close the second inside air inlet port and open the second introduction port, in an outside air mode.

6. The vehicle air conditioning system of claim 4, wherein the first switching door is configured to be controlled to open the first introduction port and close the first inside air inlet port, and the second switching door is configured to be controlled to close the second introduction port and open the second inside air inlet port, in an inside/outside air separation flow mode.

7. The vehicle air conditioning system of claim 6, wherein the inside/outside air separation flow mode is performed in a heating operation condition in which a thermal load is equal to or higher than a predetermined level in a state in which an outside air mode is selected.

8. The vehicle air conditioning system of claim 1, wherein the upper end portion and the support part of the flow guide are disposed to form a "T" shape.

9. The vehicle air conditioning system of claim 1, wherein the upper end portion of the flow guide is disposed according to a position at which a predetermined area of a suction port of the scroll case is split into one-half.

10. The vehicle air conditioning system of claim 1, wherein a lower end portion of the flow guide, extending radially and horizontally, is disposed flush with the second partition member.

11. The vehicle air conditioning system of claim 10, wherein blocking protrusions are continuously formed in a circumferential direction on inner and outer surfaces of the blower fan to clog a gap between an edge portion of the lower end portion of the flow guide and the inside surface of the blower fan and a gap between an inner peripheral edge portion of the second partition member and an outside surface of the blower fan.

12. The vehicle air conditioning system of claim 11, wherein at least a portion of the blocking protrusions is formed in an overlapped shape in a state in which it is vertically spaced apart from the edge portion of the lower end portion of the flow guide and the inner peripheral edge portion of the second partition member.

13. The vehicle air conditioning system of claim 1, wherein the second partition member is mounted, wherein an inner peripheral edge portion thereof has a predetermined gap with an outside surface of the blower fan, and the flow guide is mounted, wherein an edge portion of a lower end portion thereof has a predetermined gap with an inside surface of the blower fan.

14. The vehicle air conditioning system of claim 1, wherein
    the outlet port of the scroll case includes a first outlet port connected to the upper passage, and a second outlet port connected to the lower passage;
    the air inlet port of the air conditioning case includes a first air inlet port connected to the first outlet port, and a second air inlet port connected to the second outlet port; and the air conditioning case is configured, wherein a passage between the first air inlet port and an upper vent is separated from a passage between the second air inlet port and a lower vent.

15. The vehicle air conditioning system of claim 14, wherein the upper vent is a vent for discharging air around a vehicle window glass, and the lower vent is a vent for discharging air to a vehicle floor.

16. The vehicle air conditioning system of claim 1, wherein the flow guide includes a vertical section, a straight section, a first end of which is connected to the vertical section with an obtuse angle with respect to the vertical section, and a horizontal section to which a second end of the straight section is connected with an obtuse angle with respect to the horizontal section.

* * * * *